United States Patent
Kuroda et al.

(10) Patent No.: US 6,854,548 B2
(45) Date of Patent: Feb. 15, 2005

(54) AUTOMOBILE RUNNING CONTROL SYSTEM

(75) Inventors: Hiroshi Kuroda, Hitachi (JP); Satoru Kuragaki, Hitachi (JP); Tokuji Yoshikawa, Hitachi (JP); Toshimichi Minowa, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/388,413

(22) Filed: Mar. 17, 2003

(65) Prior Publication Data

US 2003/0173128 A1 Sep. 18, 2003

Related U.S. Application Data

(63) Continuation of application No. 09/609,764, filed on Jul. 3, 2000, now Pat. No. 6,554,090.

(30) Foreign Application Priority Data

Jul. 1, 1999 (JP) ............................................ 11-187246

(51) Int. Cl.$^7$ ............................................. B60K 31/00
(52) U.S. Cl. .......................... 180/170; 180/179; 701/93; 701/96
(58) Field of Search ................................ 180/167–170, 180/178, 179; 701/93, 96

(56) References Cited

U.S. PATENT DOCUMENTS

| | | | | |
|---|---|---|---|---|
| 4,947,952 A | * | 8/1990 | Kajiwara ..................... | 180/178 |
| 5,014,200 A | * | 5/1991 | Chundrlik et al. ..... | 364/426.04 |
| 5,173,859 A | * | 12/1992 | Deering .................. | 364/426.01 |
| 5,230,400 A | | 7/1993 | Kakinami et al. | |
| 5,454,442 A | * | 10/1995 | Labuhn et al. ............. | 180/169 |
| 5,485,892 A | * | 1/1996 | Fujita ......................... | 180/167 |
| 5,638,277 A | * | 6/1997 | Nagai ..................... | 364/426.01 |
| 5,731,977 A | * | 3/1998 | Taniguchi et al. .... | 364/426.044 |
| 5,752,214 A | | 5/1998 | Minowa et al. ............. | 701/111 |
| 5,761,629 A | * | 6/1998 | Gilling ........................ | 701/96 |
| 5,771,481 A | * | 6/1998 | Gilling ........................ | 701/93 |
| 5,850,176 A | * | 12/1998 | Kinoshita et al. ........... | 340/435 |
| 5,902,345 A | * | 5/1999 | Minowa et al. ............... | 701/96 |
| 5,969,969 A | | 10/1999 | Ejiri et al. ............ | 364/424.051 |
| 6,006,848 A | * | 12/1999 | Boehringer et al. ........ | 180/178 |
| 6,009,368 A | * | 12/1999 | Labuhn et al. ............... | 701/96 |
| 6,044,321 A | * | 3/2000 | Nakamura et al. ............ | 701/96 |
| 6,161,073 A | * | 12/2000 | Tange et al. ................... | 701/96 |
| 6,175,799 B1 | * | 1/2001 | Tsutsumi et al. ............. | 701/96 |
| 6,188,950 B1 | * | 2/2001 | Tsutsumi et al. ............. | 701/96 |
| 6,233,515 B1 | * | 5/2001 | Engelman et al. ............ | 701/96 |
| 6,236,929 B1 | * | 5/2001 | Sen et al. ..................... | 701/93 |
| 6,317,678 B1 | * | 11/2001 | Linden ........................ | 701/94 |
| 6,554,090 B1 | * | 4/2003 | Kuroda et al. .............. | 180/170 |

FOREIGN PATENT DOCUMENTS

| | | |
|---|---|---|
| EP | 0484995 | 5/1992 |
| EP | 0798150 | 10/1997 |
| EP | 0897824 | 2/1999 |
| JP | 1-273733 | 11/1989 |
| JP | 05116557 A | 5/1993 |
| JP | 06336125 A | 12/1994 |
| JP | 7-47862 | 2/1995 |
| JP | 7-225893 | 8/1995 |
| JP | 9-71154 | 3/1997 |
| JP | 10-000961 | 1/1998 |
| JP | 10-000962 | 1/1998 |
| JP | 10-166898 | 6/1998 |
| JP | 10338057 A | 12/1998 |

* cited by examiner

Primary Examiner—Lesley D. Morris
Assistant Examiner—L. Lum
(74) Attorney, Agent, or Firm—Crowell & Moring LLP

(57) ABSTRACT

An automobile running control system having "Fast follow-up" and "Slow follow-up" modes controls so that the automobile may cruise at an optimum car-to-car space between the automobile and an object which is selected among those detected and faster than a preset ground velocity in the "Fast follow-up" mode. When the fast follow-up velocity of the automobile falls under the preset velocity, the system automatically enters the "Slow follow-up" mode.

9 Claims, 9 Drawing Sheets

'cont' TRANSITS TO THE ALL FUNCTION STOP STATE.
'cancel' TRANSITS TO THE ALL STANDBY STATE.

FIG. 3

| NAME OF MEANS | INSTRUCTED | NOT INSTRUCTED |
|---|---|---|
| EQUIPMENT STARTING/STOPPING MEANS | cont | $\overline{\text{cont}}$ |
| PRESET SPEED INCREASING MEANS | Up | $\overline{\text{Up}}$ |
| PRESET SPEED DECREASING MEANS | Down | $\overline{\text{Down}}$ |
| CANCELING MEANS | cancel | $\overline{\text{cancel}}$ |
| RUNNING CONTROL SETTING MEANS | IACC | $\overline{\text{IACC}}$ |
| HIGH SPEED LIMIT CANCELING MEANS (IN LOW-SPEED RUNNING) | can_sg | $\overline{\text{can\_sg}}$ |
| MANUAL BRAKING MEANS | brake | $\overline{\text{brake}}$ |
| AUTOMATIC BRAKE | auto_brake (REQUIRED) | $\overline{\text{auto\_brake}}$ (NOT REQUIRED) |

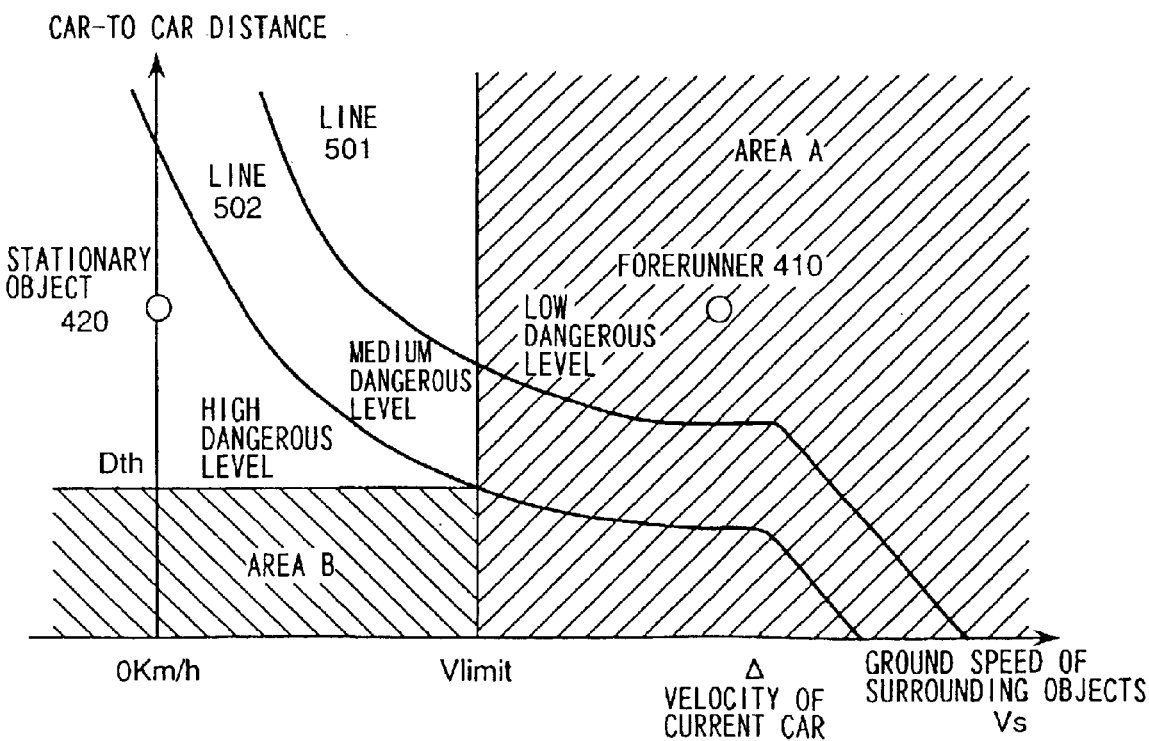

FIG. 5

AUTOMOBILE RUNNING CONTROL SYSTEM

CROSS REFERENCE OF RELATED APPLICATIONS

This application is a continuation of application Ser. No. 09/609,764, filed Jul. 03, 2003, now U.S. Pat. No. 6,554,090 B1.

BACKGROUND OF THE INVENTION

1. Field of the Invention

The present invention relates to a running control system of an automobile which runs the automobile at an optimum velocity and space relative to a forerunning vehicle.

2. Related Background Art

Conventionally, a great many efforts and practices have been made to develop component for cruising automobiles at constant velocities and constant car-to-car spaces to simplify driving operations. For example, Japanese Non-examined Patent Publication No.7-47862 (1995) has disclosed a system which enables an automobile to cruise at a preset velocity or at an optimum car-to-car space without the driver's foot on the accelerator pedal.

Further, Japanese Non-examined Patent Publications No.7-225893 (1995) and No.9-71154 (1997) have disclosed systems which automatically start and stop automobiles, freeing the drivers from frequent operations of the brake pedal and the accelerator pedal while the automobile is running slowly. Furthermore, Japanese Non-examined Patent Publication No.10-166898 (1998) has disclosed a system which has two cruising modes (slow cruising mode and fast cruising mode) and switches between these modes to accomplish fast cruising at a preset car-to-car space and low cruising in heavy traffic conditions.

However, the conventional car-to-car space control systems have been designed to calculate an optimum car-to-car space from the velocities of the current and forerunning automobiles. Therefore, for example when finding a stationary object ahead, the automobile running at a high speed must reduce its velocity much earlier to keep an optimum space from the stationary object.

Further, when finding a stationary automobile ahead, the automobile running in the slow follow-up mode must control running to keep an optimum space from the stationary automobile.

Further, almost all drivers have wanted easier and simpler driving operations in all driving ranges.

SUMMARY OF THE INVENTION

The main purpose of the present invention is to provide a running control system for an automobile which enables cruising at an optimum car-to-car space by simple and easy driving operations in any driving range (from slow running in a heavy traffic status to fast running).

The aforesaid purpose can be accomplished by a running control system comprising nearby-object detecting component for detecting an object ahead of the automobile and calculating the space between the automobile and the object and the relative velocity of the object, component for detecting the velocity of the automobile, and component for automatically controlling the velocity of the automobile; wherein said running control system has at least two cruising modes such as a slow follow-up mode and a fast follow-up mode and lets said velocity controlling component control the velocity of the automobile to keep a preset constant space between the automobile and an object detected by said nearby object detecting component in the slow follow-up mode or to keep a preset constant space between the automobile and only one of objects detected by said nearby object detecting component that is faster than a preset ground velocity in the fast follow-up mode.

Further the purpose can be accomplished by a running control system which can automatically switch to the slow follow-up mode when the target velocity of the fast-running automobile goes under a preset velocity and cancel the maximum velocity in the slow follow-up mode manually by the driver.

In accordance with the present invention, an automobile running control system having "Fast follow-up" and "Slow follow-up" modes can cruise the automobile at an optimum car-to-car space in all running ranges (from slow cruising in a heavy traffic condition to fast cruising) by controlling the velocity of the automobile so that the current automobile may keep an optimum space from the detected forerunning object which is faster than the preset ground velocity in the "Fast follow-up" mode. When the fast follow-up velocity of the automobile falls under the preset velocity, the system automatically enters the "Slow follow-up" mode, which reduces the driver's burden.

Further, the safety and convenience of the automobile can be improved and assured when the system is equipped with a means which suppresses cruising at a velocity higher than a preset velocity limit when the target velocity goes higher than the preset velocity limit and enables manual cancellation of cruising at a high-limit velocity.

BRIEF DESCRIPTION OF THE DRAWINGS

FIG. 3 shows relationships of respective setting means, operating status, and signal symbols in FIG. 1 and FIG. 2.

FIG. 5 graphically shows the relationship between the ground velocity of a nearby object and the car-to-car space.

DETAILED DESCRIPTION OF PREFERRED EMBODIMENTS

A first embodiment of the present invention will be described in detail below, referring to FIG. 1 through FIG. 9.

Figure 1:
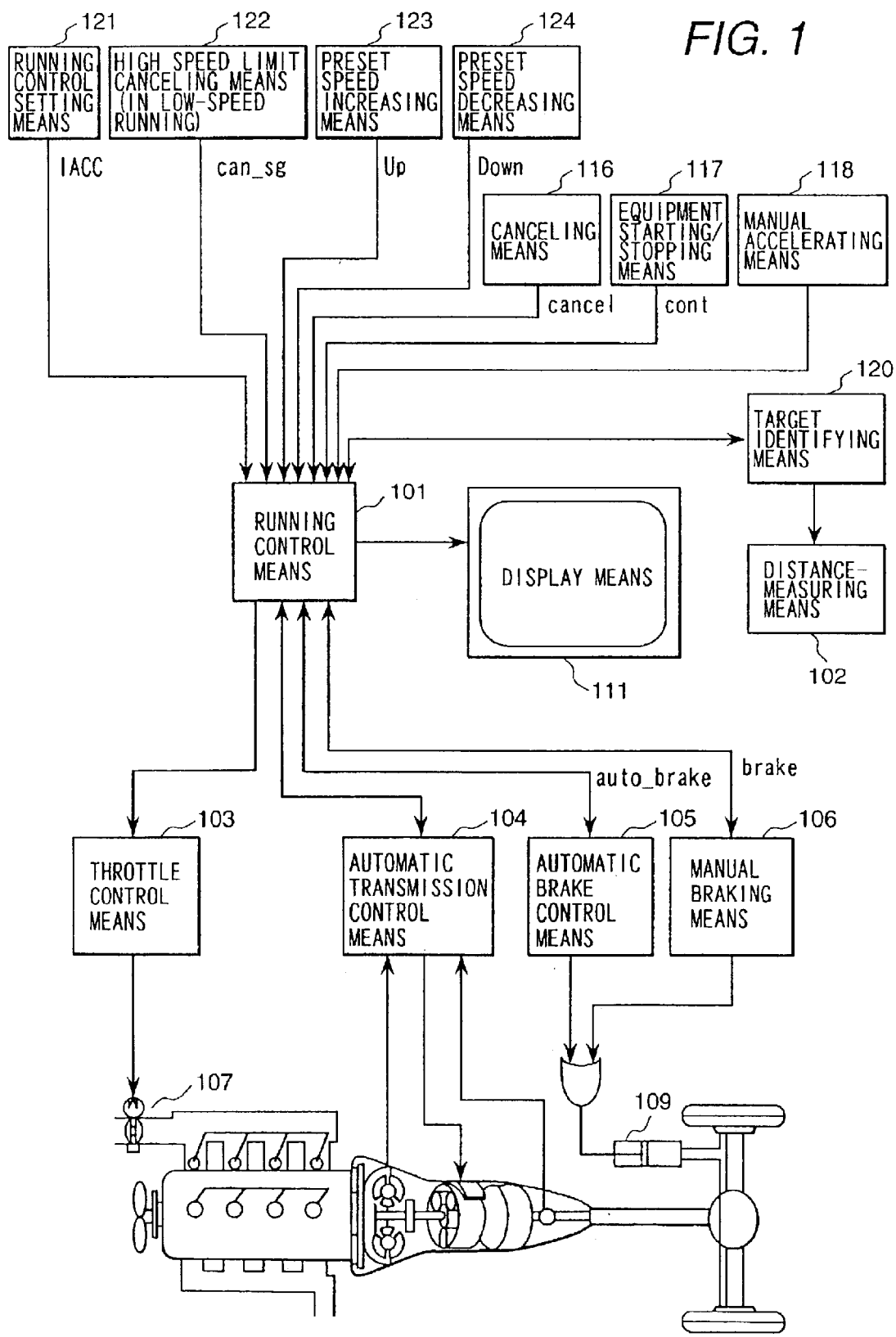
FIG. 1 is a schematic diagram of an automobile running control system which is a first preferred embodiment of the present invention.

FIG. 1 is a schematic diagram of a running control system of an automobile which is the first preferred embodiment of the present invention. Said system comprises a running control means 101, a distance measuring means 102 which measures the distance between the automobile and each of nearby objects (including a forerunning automobile) and the relative velocity of the object, a target identifying means 120 which receives information of objects (targets) from the distance measuring means 102 and identifies objects, a throttle controlling means 103 which controls opening and closing of the throttle, a throttle driving means 107, an automatic transmission controlling means 104 which controls the positions of gears in the automatic transmission, an automatic brake controlling means 105 which actuates the brake according to the command values sent from the running control means 101, a brake driving means 109, a display means 111 which displays information sent from the running control means 101 on-screen, a control setting means 121 which sets values and sends them to the running control means, a maximum slow speed canceling means 122, an accelerating means 123, a decelerating means 124, a control canceling means 116, a system start/stop means 117, a manual accelerating means 118, and a manual braking means.

Figure 2:
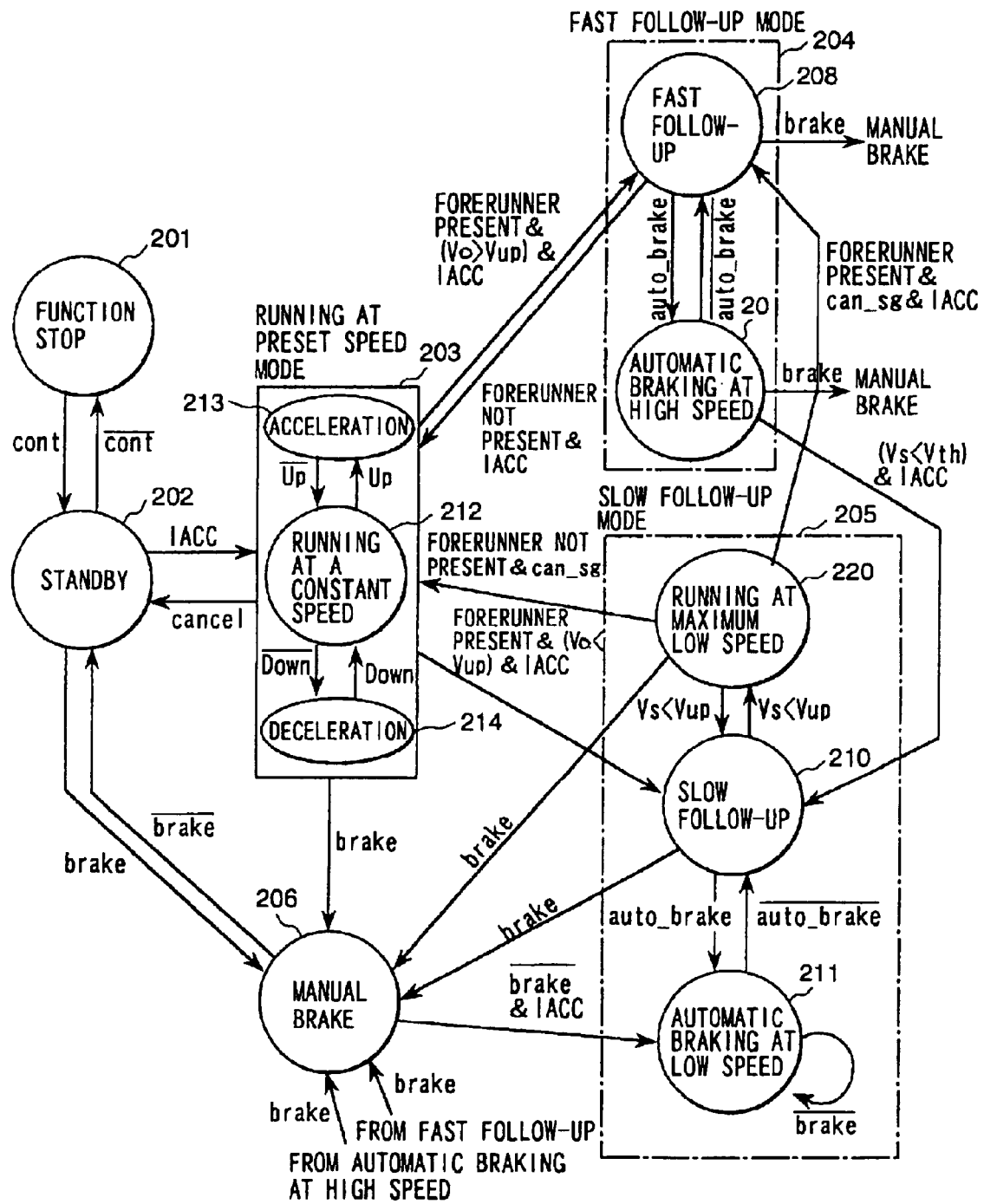
FIG. 2 shows the transition of states of the system given in FIG. 1.

FIG. 2 shows the transition of states of the system given in FIG. 1. The running control system has a functional stop status 201 in which the system stops, a standby status 202 in which no control is made, and four operation states. The operation states are "Running at a preset speed" mode 203, "Fast follow-up" mode 204, "Slow follow-up" mode 205, and "Manual brake" mode 206. Among of these states, the "Running at a preset speed" mode 203 has three sub-modes. They are "Running at a constant speed" 212, "Accelerating" 213, and "Decelerating" 214. The "Fast follow-up" mode 204 is further divided into a "Fast follow-up" state 208 and a "Fast automatic brake" status 209. Similarly, the "Slow follow-up" mode 205 is further divided into a "Slow follow-up" state 210, a "Slow automatic brake" status 211, and a "Running at maximum slow speed" state 220. When a "cont" signal is entered from the canceling means 116 in any of these modes, the running control system enters the functional stop status 201. When a "cancel" signal is entered from the canceling means 116 in any of these modes, the running control system enters the standby status 202. When the manual accelerating means 118 is turned on, the automatic brake status is canceled.

As shown in FIG. 2, when an "Up" signal is entered from the accelerating means 123 in the "Running at a constant speed" sub-mode 212, the running control system enters the "Accelerating" sub-mode 213 and increases the velocity of the automobile. Similarly, when a "Down" signal is entered from the decelerating means 124, the running control system enters the "Decelerating" sub-mode 214 and reduces the velocity of the automobile. When the distance measuring means 102 detects an object ahead of the automobile in any sub-mode of the "Running at a preset speed" mode 203, the running control system enters the "Fast follow-up" mode 204 if the velocity of the automobile [[Vs]] Vo is over the maximum slow velocity Vup or the "Slow follow-up" mode 205 if the velocity of the automobile [[Vs]] Vo is under the maximum slow velocity Vup.

FIG. 3 shows relationships of respective setting means (in FIG. 1), operating status, and signal symbols (in FIG. 2).

Below will be explained details of the first embodiment of the present invention, referring to FIG. 4 through FIG. 6.

Figure 4:
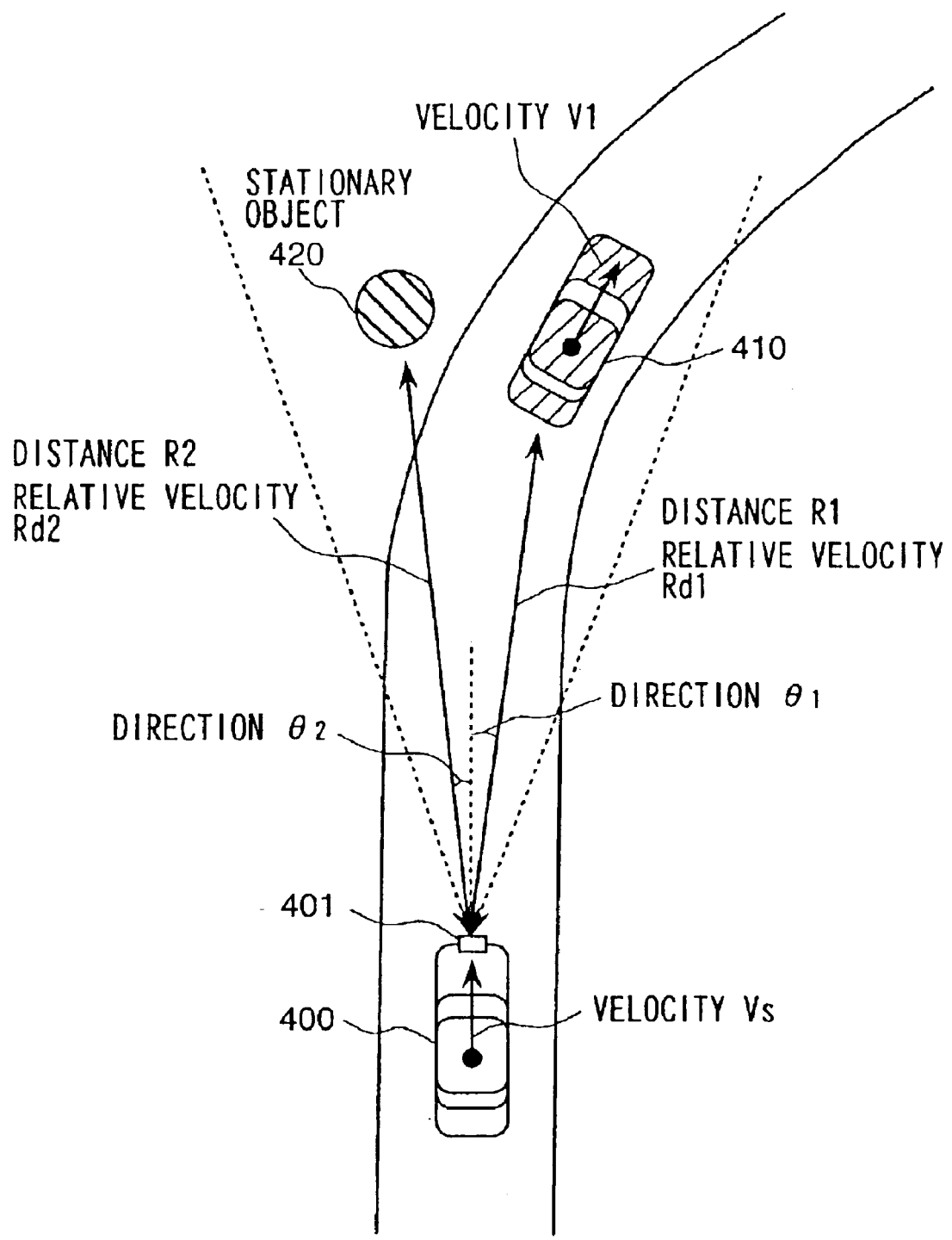
FIG. 4 is a roadway model of the first embodiment having objects to be detected.

FIG. 4 assumes that the running automobile 400 is equipped with a nearby object detecting unit including the distance measuring means 102 to measure the distances between the automobile and objects ahead of the automobile, relative velocities of the objects, and moving directions of the objects and that a running automobile 410 and a stationary object 420 (such as a post) are ahead of the automobile 400.

FIG. 5 graphically shows the relationship between the ground velocity of a nearby object (on the X-axis) and the car-to-car space (on the Y-axis). The positions of the forerunning automobile 410 and the stationary object 420 can be plotted on the graph of FIG. 5. In FIG. 5, the level of danger becomes smaller as you go further in the up and right direction and greater as you go further in the down and left direction. In other words, the area above the line 501 has a low danger level, the area between lines 501 and 502 has a medium danger level, and the area below the line 502 has a high danger level. These lines vary in proportion to the velocity of the automobile. For example, when the velocity of the forerunning automobile is equal to the velocity of the current automobile, the line 502 indicates a distance that the current automobile travels per second (approximately 14 meters at a velocity of 50 km/hour) and the line 501 indicates a distance that the current automobile travels for three seconds (approximately 42 meters at a velocity of 50 km/hour).

Figure 6:
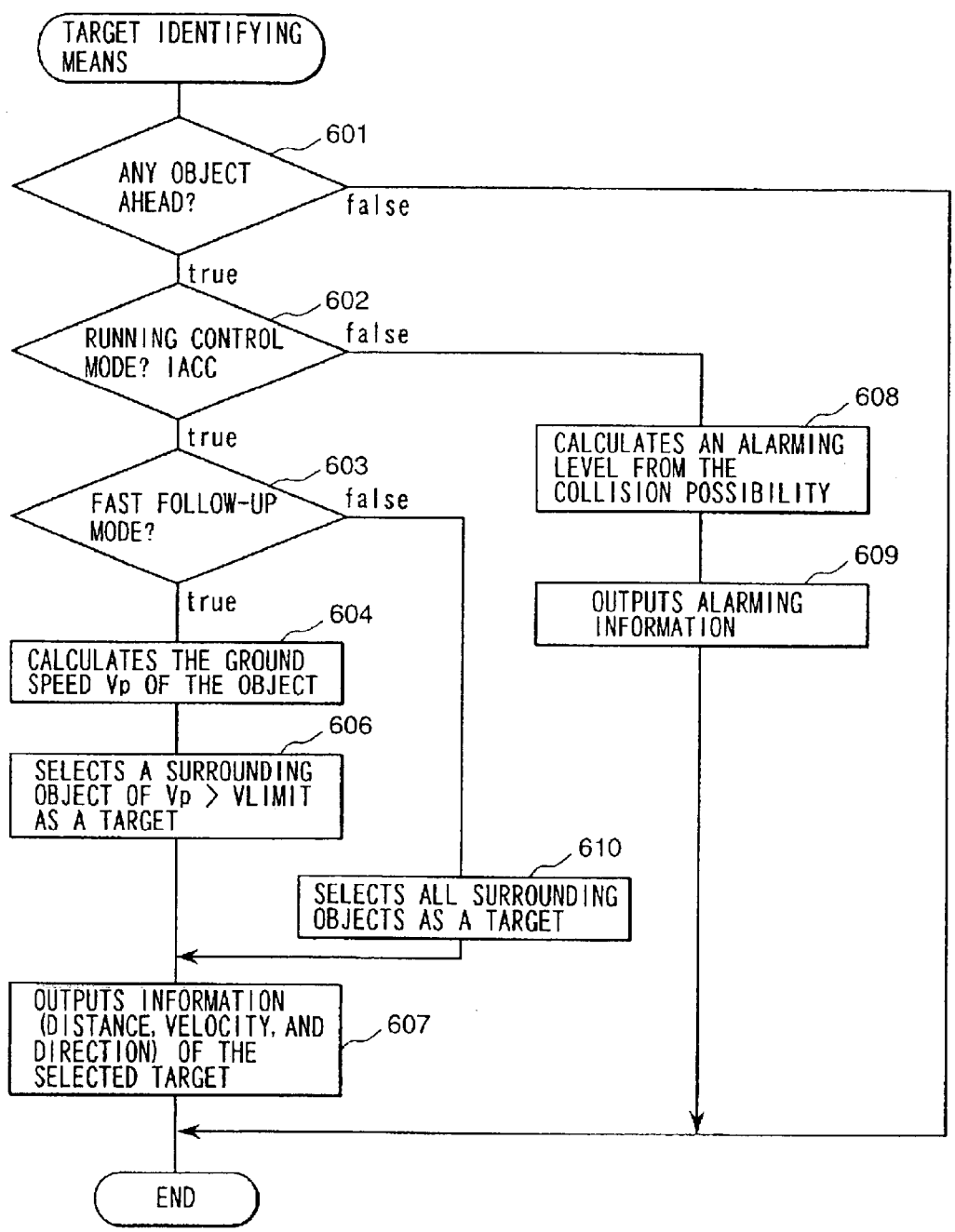
FIG. 6 shows a process flowchart of the target identifying means of the first embodiment.

FIG. 6 shows a flow of identifying a target by the target identifying means 120 of the first embodiment. Step 601 checks whether any of the objects detected by the nearby object detecting unit 401 is in the way of the current automobile. When no object is in the way of the current automobile, the nearby object detecting unit 401 ends without performing any control. When any object is in the way of the current automobile, the nearby object detecting unit 401 checks the running mode of the current automobile in Step 602. Control is transferred to Step 603 when the mode is any of "Running at a preset speed," "Fast follow-up," and "Slow follow-up" modes. In the other running mode, the nearby object detecting unit 401 determines a warning level from the danger level of the object detected in Step 608 and outputs warning information in Step 609. As one of methods of determining a danger level, the nearby object detecting unit 401 employs a method of using information of a velocity of the forerunning object, a distance between the current automobile and the forerunning object and information of the velocity and direction of the current automobile in combination.

In Step 603, the nearby object detecting unit 401 checks whether the current automobile is in the "Fast follow-up" mode 204. When the current automobile is not in the "Fast follow-up" mode 204, all objects that are detected are selected as targets in Step 610. When the current automobile is in the "Fast follow-up" mode 204, Step 604 calculates the ground velocity Vp of each of the objects which are detected in Step 604. Step 606 selects objects whose ground velocities are over a preset velocity Vlimit.

In Step 607, the nearby object detecting unit 401 outputs information about a target which is selected in Step 606 or 610 to the running control means 101. Step 606 uses the area A in FIG. 5 as the area for the ground velocity Vlimit or higher for judgment. The Vlimit value in FIG. 5 is about 60% to 80% of the velocity of the current automobile although it varies according to the velocity of the current automobile.

Figure 7:
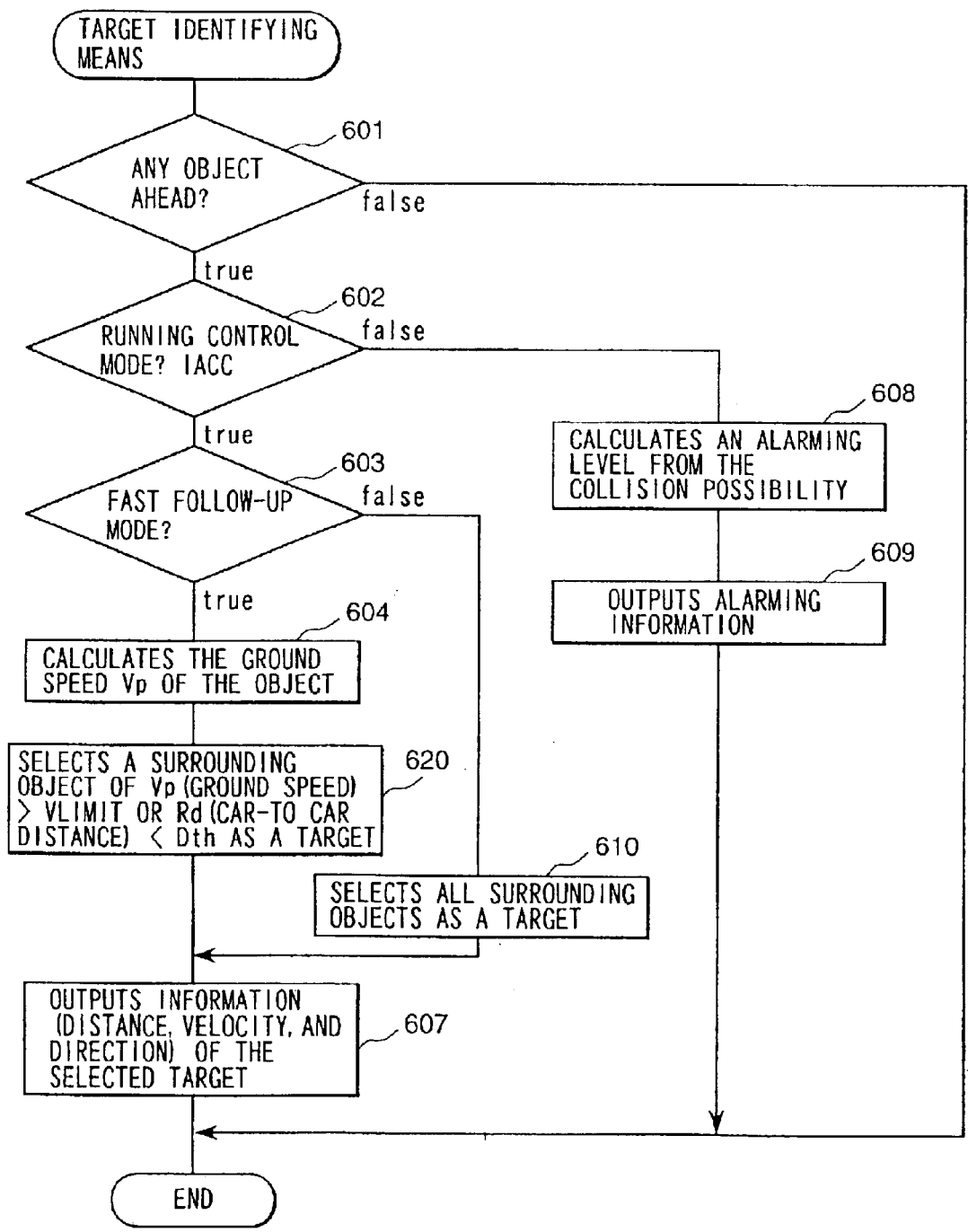
FIG. 7 shows a process flowchart of the target identifying means of the other embodiment.

FIG. 7 shows another flow of identifying a target by the target identifying means 120 of the first embodiment. The flow in FIG. 7 is almost the same as that in FIG. 6 except for Step 620. In the flow of FIG. 7, Step 620 selects an object whose ground velocity is over Vlimit or whose car-to-car space is under Dth (area B in FIG. 5) and outputs information of the target which is selected in Step 607 to the running control means 101. The Dth value is approximately 30 meters to 80 meters although it varies according to the velocity of the current automobile.

Figure 8:
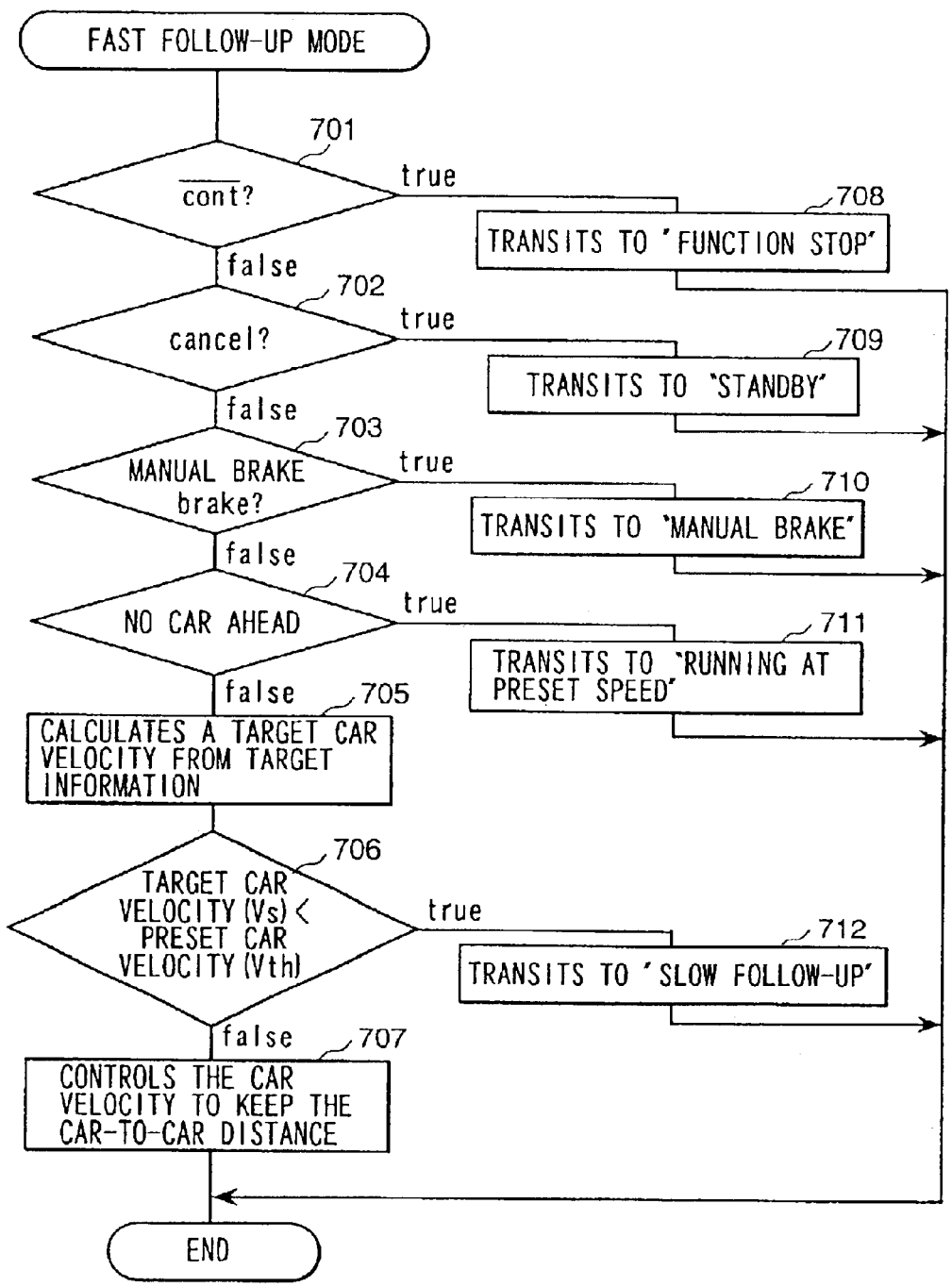
FIG. 8 shows a process flowchart in the "Fast follow-up" mode of the first embodiment.

Below will be explained the operations of the "Fast follow-up" mode 204 of the first embodiment, referring to FIG. 8. In this mode, the running control system checks the status of respective setting means at preset time intervals (10 msec to 200 msec) and performs processing according to the status. Step 701 checks the status of the system start/stop means 117. When the means 117 is operated to stop, the system enters the function stop mode 201 (in Step 708). Step 702 checks the status of the canceling means 116. When the means 117 is operated to cancel, the system enters the standby mode 202 (in Step 709). Step 703 checks the status of the manual braking means 106. When the means 106 is operated, the system enters the manual braking mode 206 (in Step 710).

Step 704 checks whether there is an automobile in the way of the current automobile from information of targets which are selected and sent from the target selecting means 120. When Step 704 judges that no automobile is in the way of the current automobile, the running control system enters the "Running at a constant velocity" mode 203 (in Step 711). When Step 704 judges that an automobile is in the way of the current automobile, Step 705 calculates an optimum velocity Vs of the current velocity to keep an optimum space between the current automobile and the target from information such as a distance between the current automobile and the target and the relative velocity of the target.

When Step 706 judges that the calculated velocity Vs is less than the preset velocity Vth, the system enters the "Slow follow-up" mode 205 (in Step 712). In this case, Vth is a velocity at which the mode changes from the "Fast follow-up" mode to the "Slow follow-up" mode and it is approximately 40 km/hour to 60 km/hour. When Step 706 judges the calculated velocity Vs is not less than the preset velocity Vth, the system remains in the "Fast follow-up" mode and Step 707 controls the velocity of the automobile to keep an optimum space between the current automobile and the target object.

Figure 9:
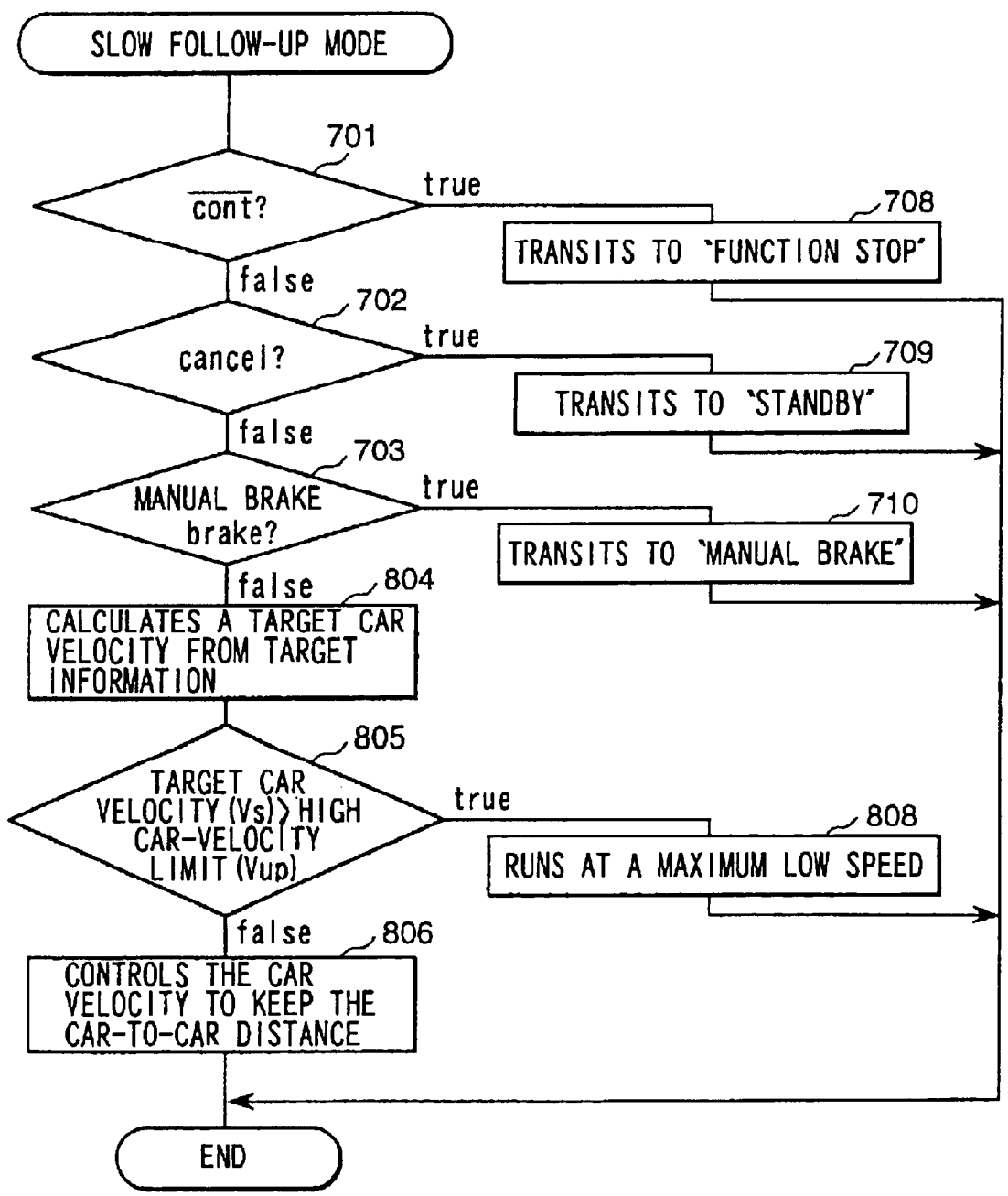
FIG. 9 shows a process flowchart in the "Slow follow-up" mode of the first embodiment.

Below will be explained the operations of the "Slow follow-up" mode 205 of the first embodiment, referring to FIG. 9. In this mode, the running control system checks the status of respective setting means at preset time intervals (10 msec to 200 msec) and performs processing according to the status. Steps 701 through 703 and 708 through 710 in FIG. 9 are the same as those of FIG. 8. When Step 703 finds that the brake is not manually turned on, Step 804 calculates an optimum velocity Vs of the current automobile from information of a target which is selected and sent by the target selecting means such as a distance between the current automobile and the target and the relative velocity.

Step 805 compares the calculated velocity Vs by the preset high-limit velocity Vup (approx. 40 km/hour to 60 km/hour). When the calculated velocity Vs is greater than the preset high-limit velocity Vup, the system enters the "Running at the maximum low velocity" status 220 (in Step 808) to run the automobile at the maximum low velocity Vup.

When the calculated velocity Vs is less than the preset high-limit velocity Vup (in Step 805), Step 806 controls the velocity of the current automobile to keep an optimum space from the forerunning automobile. In this case, the maximum slow velocity Vup is equal to or greater than the preset velocity Vth at which the mode changes from the "Fast follow-up" mode to the "Slow follow-up" mode.

Figure 10:
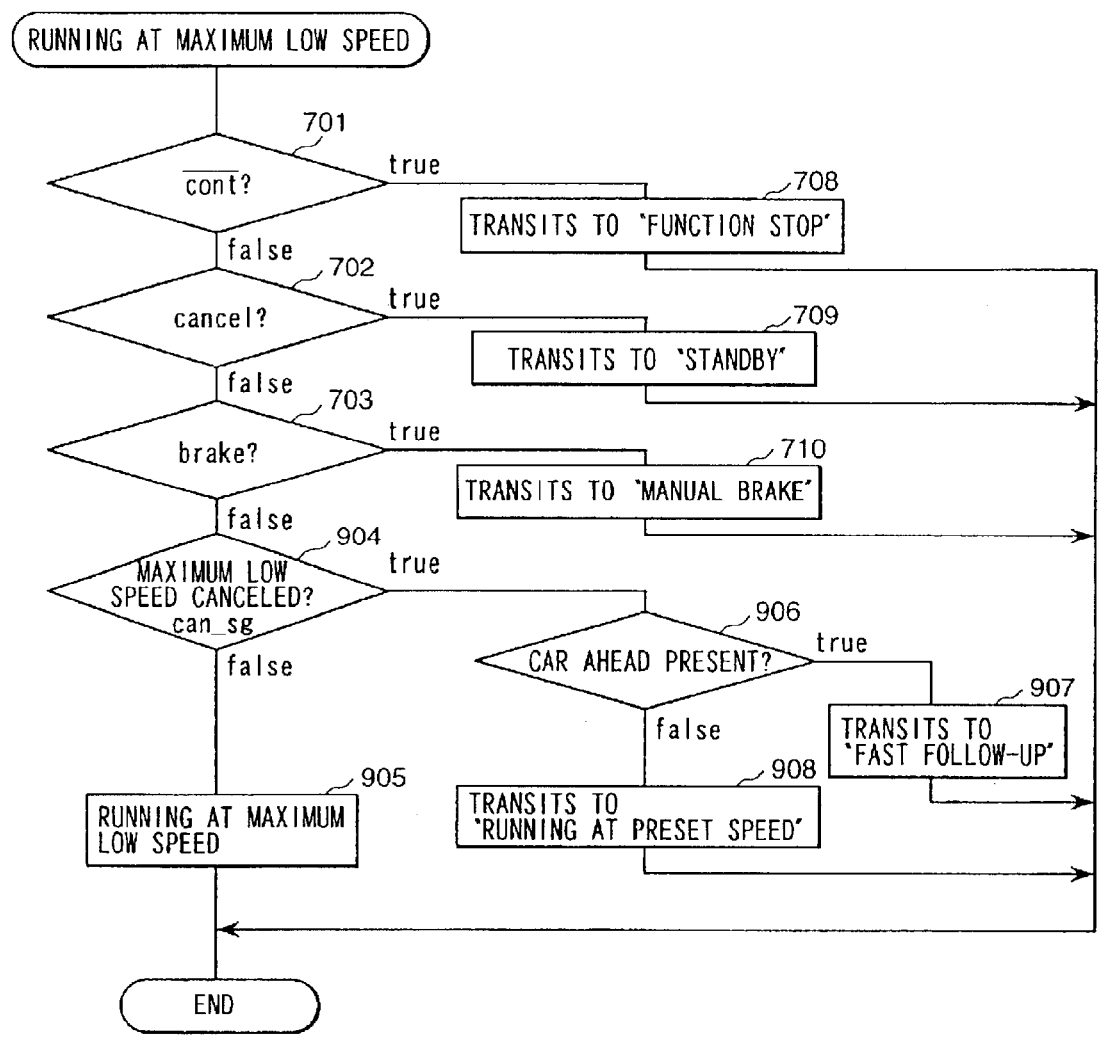
FIG. 10 shows a process flowchart in the "Running at a maximum slow velocity" mode of the first embodiment.

Below will be explained the operations of the embodiment of the present invention in the "Running at the maximum low velocity" status 220, referring to FIG. 10. Steps 701 through 703 and 708 through 710 in FIG. 10 are the same as those of FIG. 8. When Step 703 finds that the brake is not manually turned on, Step 904 checks the status of the maximum slow speed canceling means 122. When the means 122 is not turned on, Step 905 sets the system in the "Running at the maximum slow velocity" status 220 to run the current automobile at the maximum slow velocity. When Step 904 finds that the maximum slow speed canceling means 122 is turned on, control is transferred to Step 906. Step 906 checks whether any automobile is in the way of the current automobile from target information sent from the target identifying means 120. When it is found that any automobile is in the way of the current automobile, the system enters the "Fast follow-up" mode 204 (in Step 907). When it is found that no automobile is in the way of the current automobile, the system enters the "Running at a preset velocity" mode 203 (in Step 908).

As described above, in accordance with the present invention, an automobile running control system having "Fast follow-up" and "Slow follow-up" modes can cruise the automobile at an optimum car-to-car space in all running ranges (from slow cruising in a heavy traffic condition to fast cruising) by controlling the velocity of the automobile so that the current automobile may keep an optimum space from the detected forerunning object which is faster than the preset ground velocity in the "Fast follow-up" mode. When the fast follow-up velocity of the automobile falls under the preset velocity, the system automatically enters the "Slow follow-up" mode, which reduces the driver's burden.

Further, the safety and convenience of the automobile can be improved and assured when the system is equipped with a means which suppresses cruising at a velocity higher than a preset velocity limit when the target velocity goes higher than the preset velocity limit and enables manual cancellation of cruising at a high-limit velocity.

What is claimed is:

1. A control system for a vehicle comprising, a nearby object detector which detects nearby objects existing around the vehicle and calculates distance between the vehicle and the nearby objects and relative velocity of the nearby objects;

a velocity detector which detects velocity of the vehicle;

a velocity controller which controls the velocity of the vehicle;

wherein the velocity controller comprises a slow velocity cruising mode which is activated when the vehicle velocity is below a predetermined vehicle velocity value, and a high velocity cruising mode which is activated when the vehicle velocity is above the predetermined vehicle velocity value, and wherein during the slow velocity cruising mode the velocity controller controls a distance between the vehicle and a first object selected among the nearby objects so as to assume a predetermined distance value, and during the high velocity cruising mode the velocity controller controls a distance between the vehicle and a second object among the nearby objects having a ground velocity larger than a predetermined ground velocity value so as to assume a predetermined distance value.

2. A control system according to claim 1, further comprises an operator braking input unit which receives an input of brake operation by an operator, wherein during either the high velocity cruising mode or the slow velocity cruising mode, when the input of brake operation by the operator is received, the operator braking input unit activates an operator brake mode which activates brake in response to the brake operation by the operator.

3. A control system according to claim 2, wherein during activation of the operator brake mode, when the input of brake operation by the operator ends, the slow velocity cruising mode is activated.

4. A vehicle comprising a control system which comprises a nearby object detector which detects nearby objects existing around the vehicle, calculates distance between the vehicle and the nearby objects, and calculates relative velocity of the nearby objects, a velocity detector which detects velocity of the vehicle, and a velocity controller which controls the velocity of the vehicle, wherein the vehicle comprises a slow velocity cruising mode which is activated when the vehicle velocity is below a predetermined vehicle velocity value, and a high velocity cruising mode which is activated when the vehicle velocity is above a predetermined vehicle velocity value, and during the slow velocity cruising mode a distance between the vehicle and a first object selected from the nearby objects is controlled so as to assume a predetermined distance value, and during the high velocity cruising mode a distance between the vehicle and a second object selected from the nearby objects having a ground velocity larger than a predetermined ground velocity value is controlled so as to assume a predetermined distance value.

5. A vehicle according to claim 4, further comprising an operator braking input unit which receives an input of brake operation by an operator, wherein during either the high velocity cruising mode or the slow velocity cruising mode, when the input of brake operation by the operator is received, the operator braking input unit activates an operator brake mode which is activated in response to the brake operation by the operator.

6. A vehicle according to claim 5, wherein during activation of the operator brake mode, when the input of brake operation by the operator ends, the slow velocity cruising mode is activated.

7. A control method for a vehicle in which nearby objects existing around the vehicle are detected, distance and relative velocity between the vehicle and the nearby objects are calculated, velocity of the vehicle is detected, and the velocity of the vehicle is controlled, wherein when the vehicle velocity is below a predetermined vehicle velocity value, a distance between the vehicle and a first object selected from the nearby objects is controlled so that the vehicle assumes a predetermined distance value, and when the vehicle velocity is above a predetermined vehicle velocity value, a distance between the vehicle and a second object among the nearby objects having a ground velocity larger than a predetermined ground velocity value is controlled so that the vehicle assumes a predetermined distance value.

8. A control method according to claim 7, when a brake operation by an operator is performed, a brake is activated in response to the brake operation by the operator.

9. A control method according to claim 8, wherein if the brake operation by the operator ends after being performed, a distance between the vehicle and the first object selected from the nearby objects is controlled so that the vehicle assumes a predetermined distance value.

* * * * *